US012679664B2

(12) United States Patent
Shih et al.

(10) Patent No.: US 12,679,664 B2
(45) Date of Patent: Jul. 14, 2026

(54) INTERCEPTION MECHANISM FOR CONVEYOR BELT PRODUCTION LINE ABNORMALITY

(71) Applicant: CVC TECHNOLOGIES INC., Taichung City (TW)

(72) Inventors: Chi-Huan Shih, Taichung City (TW); Chang-Cheng Chen, Taichung City (TW); Jyun-Yang Syu, Taichung City (TW)

(73) Assignee: CVC TECHNOLOGIES INC., Taichung City (TW)

( * ) Notice: Subject to any disclaimer, the term of this patent is extended or adjusted under 35 U.S.C. 154(b) by 173 days.

(21) Appl. No.: 18/884,147

(22) Filed: Sep. 13, 2024

(65) Prior Publication Data

US 2026/0077959 A1      Mar. 19, 2026

(51) Int. Cl.
| | |
|---|---|
| *B65G 47/29* | (2006.01) |
| *B65G 15/22* | (2006.01) |
| *B65G 43/02* | (2006.01) |
| *B65G 43/08* | (2006.01) |
| *B65G 47/88* | (2006.01) |

(52) U.S. Cl.
CPC ............. *B65G 47/29* (2013.01); *B65G 15/22* (2013.01); *B65G 43/02* (2013.01); *B65G 43/08* (2013.01); *B65G 47/8815* (2013.01); *B65G 2201/0244* (2013.01); *B65G 2203/0233* (2013.01); *B65G 2203/044* (2013.01)

(58) Field of Classification Search
None
See application file for complete search history.

(56) References Cited

U.S. PATENT DOCUMENTS

| | | | | | |
|---|---|---|---|---|---|
| 4,173,276 | A | * | 11/1979 | Raudat | B65G 43/08 |
| | | | | | 198/444 |
| 4,506,493 | A | * | 3/1985 | Horton | B65B 35/44 |
| | | | | | 53/247 |
| 5,170,879 | A | * | 12/1992 | Smith | B65G 51/035 |
| | | | | | 198/452 |

(Continued)

FOREIGN PATENT DOCUMENTS

| | | | | | |
|---|---|---|---|---|---|
| CN | | 205526533 U | * | 8/2016 | |
| DE | | 3916423 C1 | * | 11/1990 | B65B 21/04 |

(Continued)

*Primary Examiner* — Gene O Crawford
*Assistant Examiner* — Muhammad Awais
(74) *Attorney, Agent, or Firm* — WPAT, PC

(57) ABSTRACT

An interception mechanism for conveyor belt production line abnormality includes a conveyor belt device for transporting bottles; at least an interception cylinder movably disposed on one side of the conveyor belt device; and a plurality of fullness sensing devices disposed on one side of the conveyor belt device at intervals. When at least two of the fullness sensing devices simultaneously sense the bottles passing, the interception cylinder stops the bottles from continuing to move forward. When only one of the fullness sensing device senses the bottles passing at one time, the interception unit returns to its original position, allowing the bottles to continue to move, ensuring a stable bottle transportation, preventing bottles from piling up at the outlet, thereby improving the production efficiency of the production line.

10 Claims, 7 Drawing Sheets

(56)                    References Cited

U.S. PATENT DOCUMENTS

| | | | | |
|---|---|---|---|---|
| 5,236,077 | A | * | 8/1993 | Hoppmann .......... B65G 47/525 |
| | | | | 198/395 |
| 5,423,431 | A | * | 6/1995 | Westin ...................... B07C 5/02 |
| | | | | 209/539 |
| 5,768,860 | A | * | 6/1998 | Weaver ............. B65G 21/2072 |
| | | | | 198/444 |
| 7,232,026 | B2 | * | 6/2007 | Heuft ................... B65G 47/088 |
| | | | | 198/453 |
| 7,331,443 | B2 | * | 2/2008 | Schoenke .......... B65G 21/2018 |
| | | | | 198/398 |
| 2003/0209409 | A1 | * | 11/2003 | Horton .............. B65G 47/5131 |
| | | | | 198/444 |
| 2009/0288778 | A1 | * | 11/2009 | Yang ...................... B65C 3/163 |
| | | | | 156/538 |
| 2019/0248590 | A1 | * | 8/2019 | Hsiao ................ B65G 21/2072 |
| 2019/0283968 | A1 | * | 9/2019 | Hsiao .................... B65G 15/58 |
| 2022/0001423 | A1 | * | 1/2022 | Fuhrmann ................ B07C 5/02 |
| 2023/0211959 | A1 | * | 7/2023 | Helfrich .............. B65G 47/715 |
| | | | | 198/418.7 |

FOREIGN PATENT DOCUMENTS

| | | | | | |
|---|---|---|---|---|---|
| DE | 102010050035 | A1 | * | 5/2012 | ......... B65G 21/2072 |
| GB | 2090804 | A | * | 7/1982 | ........... B65G 47/082 |
| GB | 2273089 | A | * | 6/1994 | ........ B65G 47/2445 |
| JP | H05147724 | A | * | 6/1993 | |
| KR | 102491843 | B1 | * | 1/2023 | ............. B65G 47/29 |
| WO | WO-2020055310 | A1 | * | 3/2020 | ............. B65G 47/88 |
| WO | WO-2020059127 | A1 | * | 3/2020 | ............. B65G 47/88 |
| WO | WO-2024052210 | A1 | * | 3/2024 | ......... B65G 47/8876 |

* cited by examiner

INTERCEPTION MECHANISM FOR CONVEYOR BELT PRODUCTION LINE ABNORMALITY

BACKGROUND OF THE INVENTION

1. Field of the Invention

The present invention relates to interception mechanisms, and more particularly, to an interception mechanism for conveyor belt production line abnormality.

2. Description of the Related Art

Conventional conveyor belt production lines are used to transport bottles, primarily used in industries such as beverages, food, and cosmetics, to transport bottled products from one production process to the next one.

However, the system monitoring methods used in the conventional conveyor belt production lines are less advanced, failing to effectively manage the transportation conditions of bottles. When the transport process of bottles becomes uncontrollable, bottles are easily piled-up at the outlet, which severely affects the smoothness of the production process, reducing the overall production efficiency. In addition, piling-up of bottles may lead to collision and breakage of bottles, increasing the risk of product damage.

Furthermore, due to the lack of automated and intelligent management measures, users have to frequently and manually intervene and perform maintenance, increasing labor costs and operational difficulty.

The issues above reveal various disadvantages in the conventional conveyor belt production lines during bottle transportation process. Improvement on the conventional conveyor belt production lines is desirable.

SUMMARY OF THE INVENTION

The present invention aims at improving the issue of multiple bottles potentially piling up at the outlet during the transportation process of a conveyor belt system.

To achieve the objectives above, an embodiment of the present invention provides an interception mechanism for conveyor belt production line abnormality, comprising:

a conveyor belt device for transporting a plurality of bottles;

at least an interception cylinder movably disposed on one side of the conveyor belt device, the interception cylinder having an interception unit capable of moving across a top face of the conveyor belt device; and a plurality of fullness sensing devices disposed on one side of the conveyor belt device at intervals, the fullness sensing devices signally connected with the interception cylinder, each of the fullness sensing devices having a first sensing unit; when at least two of the first sensing units simultaneously sense one of the bottles, the interception unit extends to stop the bottles from continuing to move forward; when only one of the first sensing units senses one of the bottles at one time, the interception unit returns to its original position, allowing the bottles to continue to move.

With such configuration, by incorporating the interception cylinder with the fullness sensing device, the transportation speed of bottles is effectively monitored during the transport process. When the transportation speed is too high, the interception unit actively extends to intercept the newly fed bottles. Once the piling up of bottles near the outlet is alleviated, the interception unit returns to the original position, allowing subsequent bottles to be fed, thereby ensuring the stable transportation of bottles, effectively improving the abnormal piling up of bottles at the outlet, and enhancing the production efficiency of the production line.

DETAILED DESCRIPTION OF THE INVENTION

Figure 1:
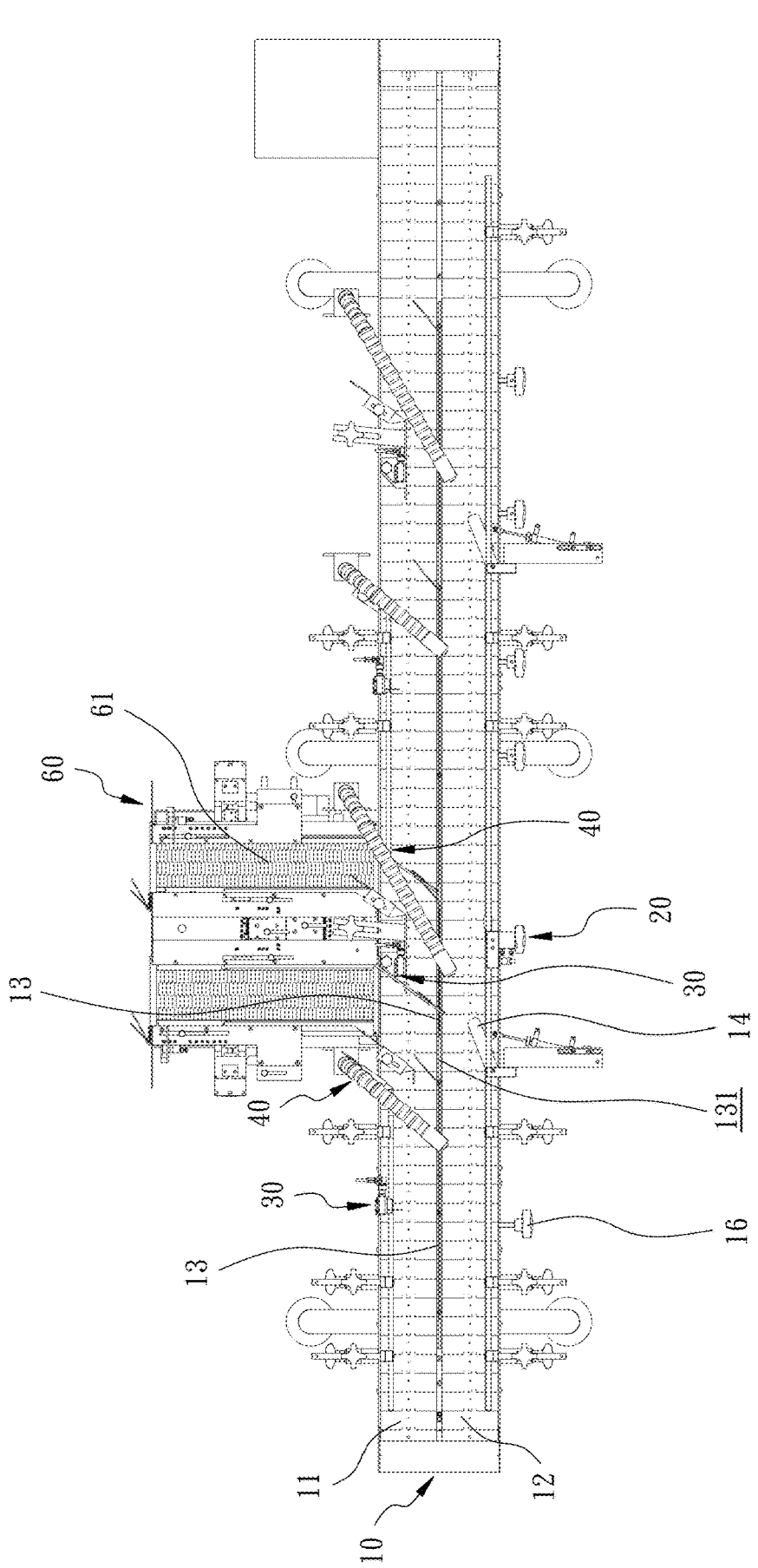
FIG. 1 is a top view of the conveyor belt production line in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion. Also, to enhance readability, certain parts constituting components are omitted in some drawings, or depicted using other methods such as imaginary lines.

Referring to FIG. 1 to FIG. 7, the present invention discloses an interception mechanism for conveyor belt production line abnormality, comprising a conveyor belt device 10, at least an interception cylinder 20, and a plurality of fullness sensing devices 30.

The conveyor belt device 10 is used to convey a plurality of bottles 50.

The interception cylinder 20 is movably disposed on one side of the conveyor belt device 10, and the interception cylinder 20 has an interception unit 21 capable of moving across a top face of the conveyor belt device 10.

The fullness sensing devices 30 are disposed on one side of the conveyor belt device 10 at intervals and signally connected with the interception cylinder 20. Each fullness sensing device 30 comprises a first sensing unit 31. When at least two of the first sensing units 31 simultaneously sense any one of the bottles 50, the interception unit 21 extends to stop the bottles 50 from continuing to move forward; then, when only one of the first sensing units 31 senses the bottle 50 at one time, the interception unit 21 returns to its original position, allowing the bottles 50 to continue to move.

Specifically, when the flow of the bottles 50 on the conveyor belt device 10 increases, and two of the first sensing units 31 simultaneously sense the bottles 50, it is indicated that the bottles 50 have entered a congested state. At this point, the interception unit 21 stops the bottles 50 from continuing to move forward, so as to prevent more bottles 50 from entering the congested area and further worsening the congestion. Accordingly, the interception unit 21 only returns to its original position when the congested state is resolved; in other words, when only one of the first sensing units 31 senses the bottle 50 at the same time, the interception unit 21 returns to its original position, so as to re-allow the bottles 50 to be transported. By incorporating the fullness sensing devices 30 with the interception cylinder 20, the flow of the bottles 50 is detected and controlled in real-time, avoiding collisions and congestion between the bottles 50.

In other words, when the transportation of the bottles 50 is congested, the present invention intercepts newly fed bottles 50, allowing the bottles 50 previously enter the conveyor belt device 10 to be processed first, and the subsequent bottles 50 continue to be transported, thereby preventing the bottles 50 from piling up.

Figure 2:
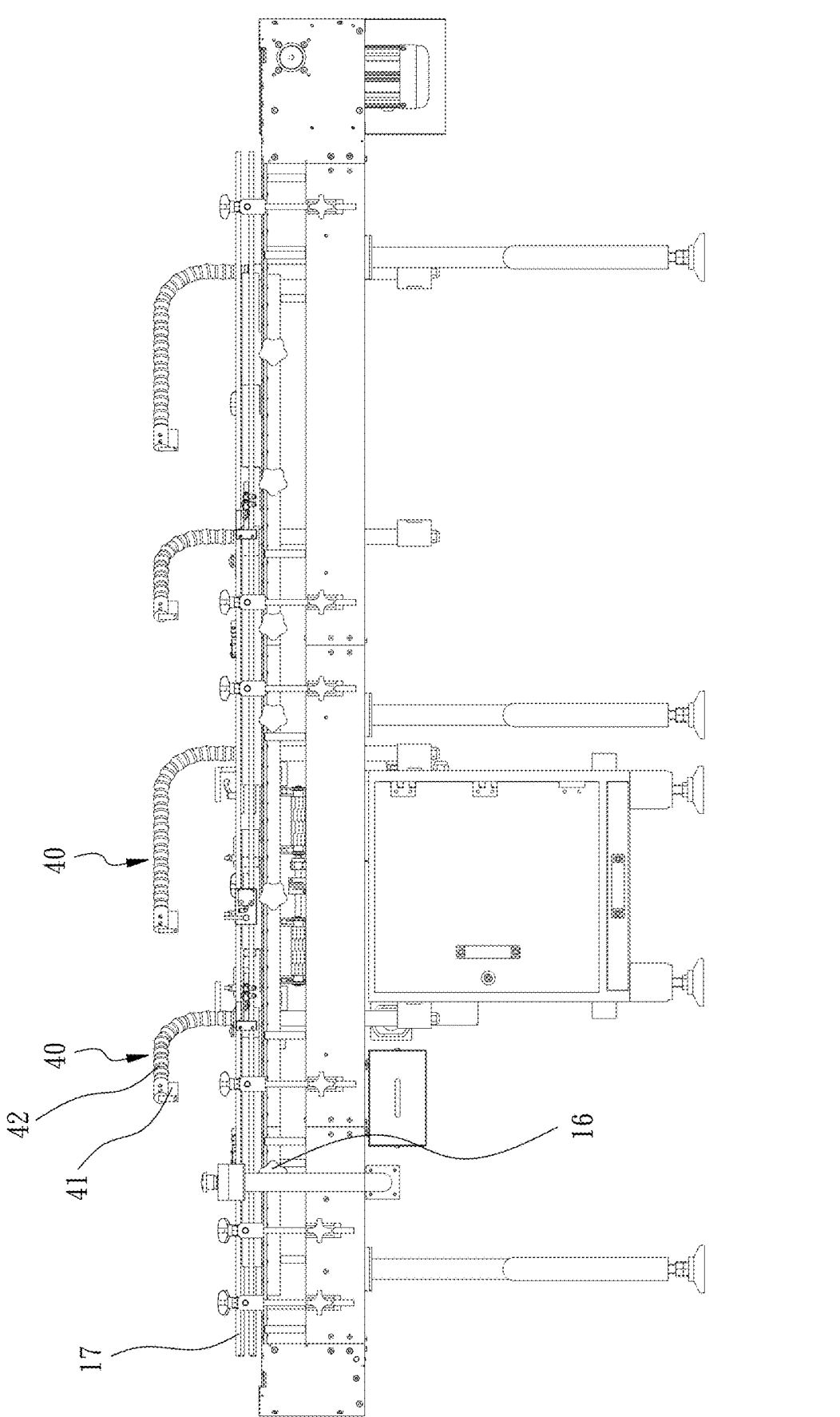
FIG. 2 is a side view of the conveyor belt production line in accordance with an embodiment of the present invention.

Referring to FIG. 2, a protection fence 17 is disposed on two sides of the conveyor belt device 10, respectively. The protection fence 17 helps prevent the bottles 50 from falling off the lateral sides of the conveyor belt device 10 during the transportation process.

Figure 3:
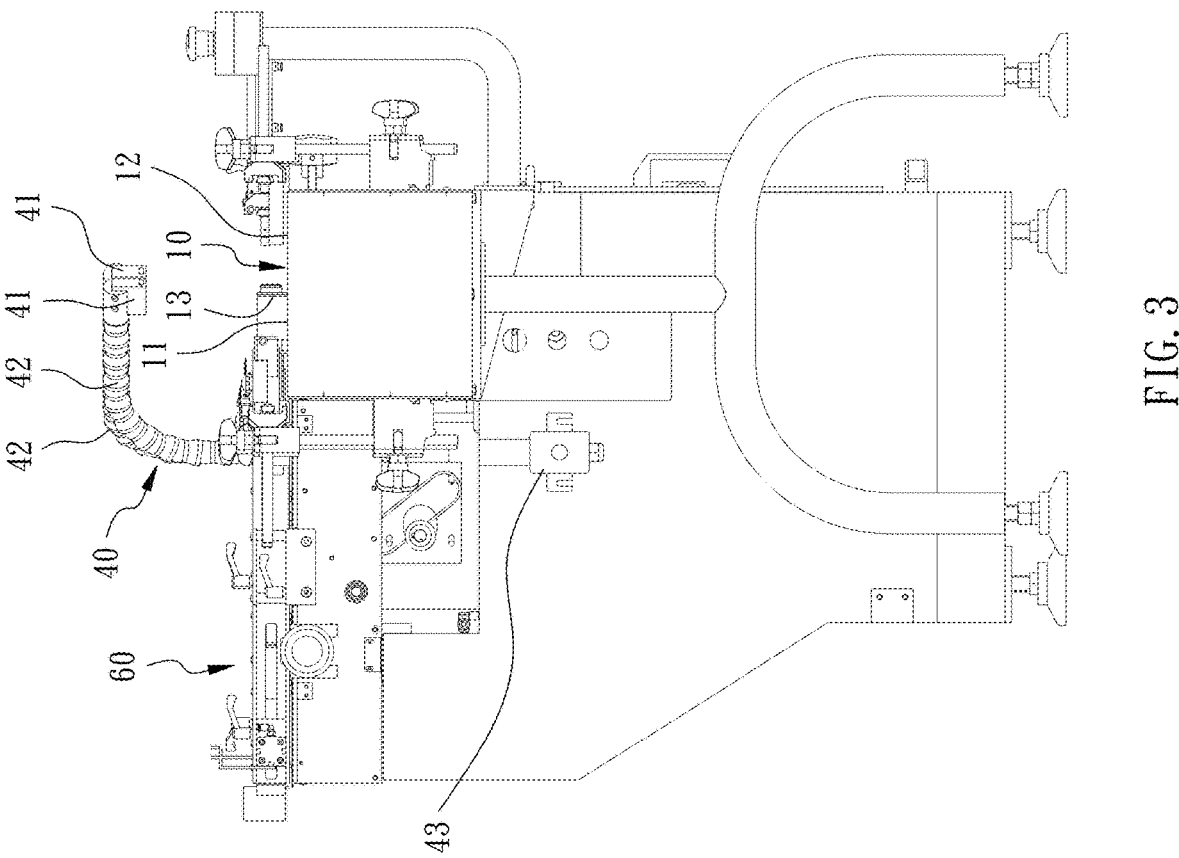
FIG. 3 is a schematic view of the conveyor belt production line taken from another point of view.
Figure 5:
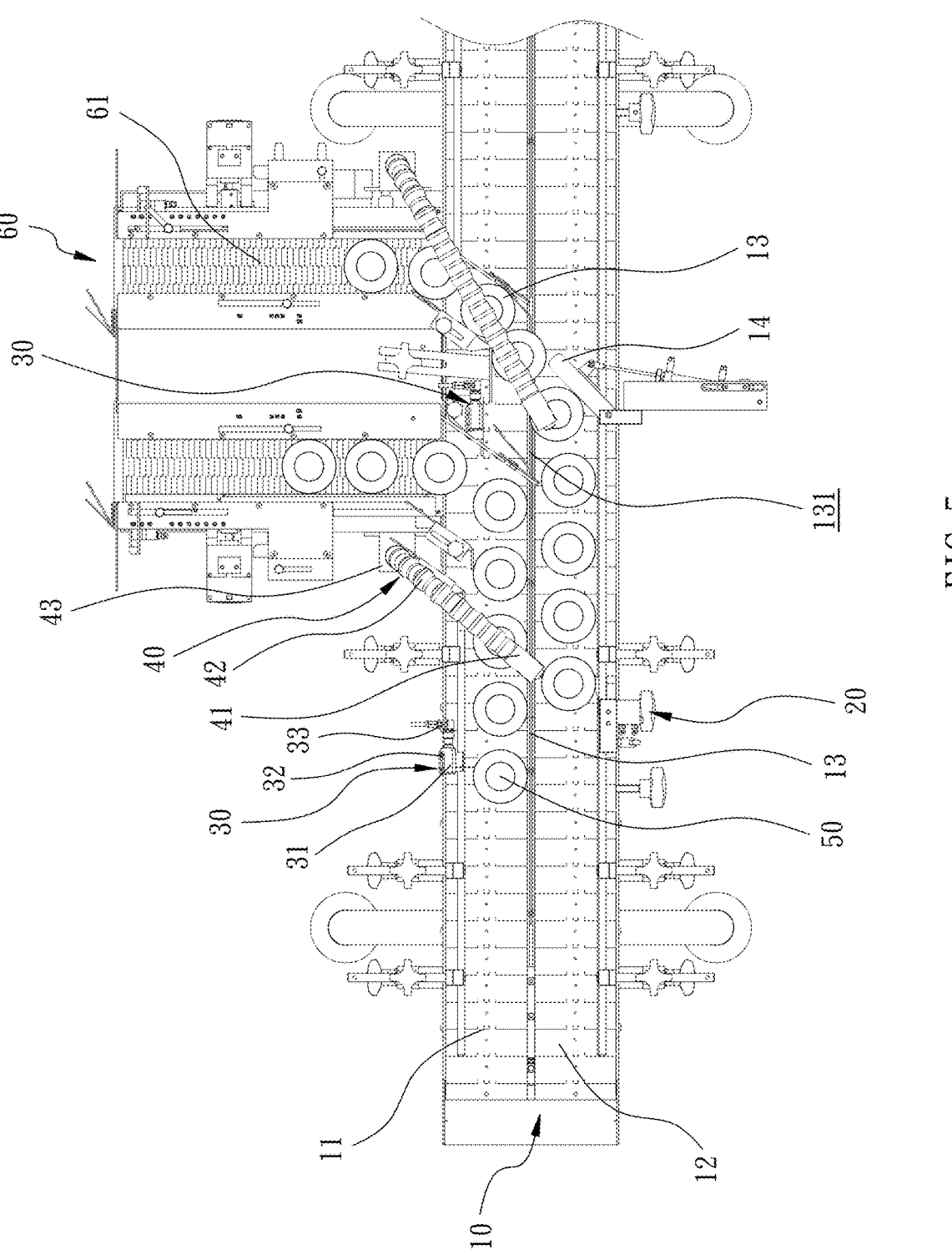
FIG. 5 is a sectional view illustrating the first conveyor belt and the second conveyor belt conveying bottles in the normal status.
Figure 6:
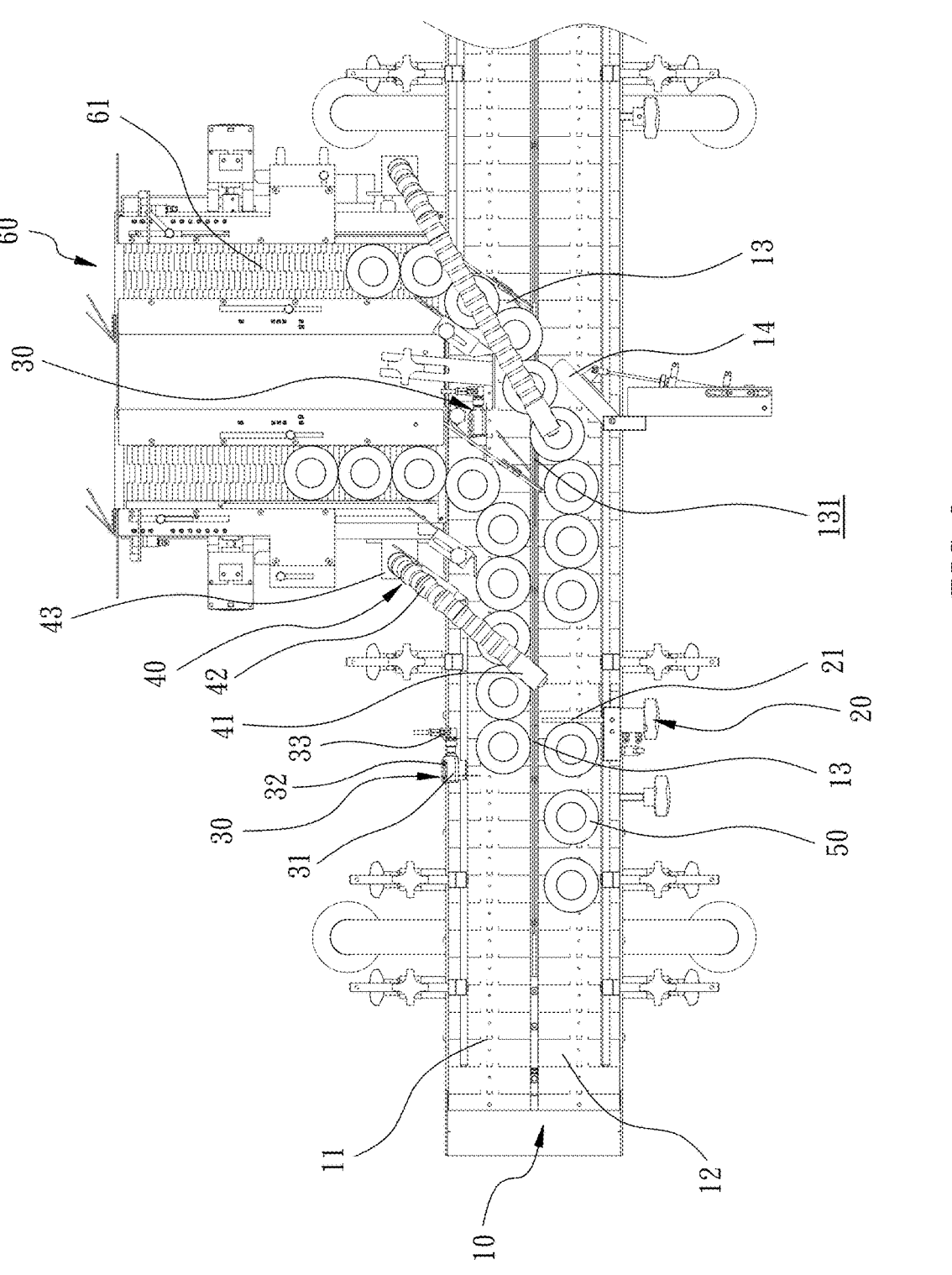
FIG. 6 is a sectional view illustrating the first conveyor belt and the second conveyor belt conveying bottles when the bottles are piled up.

Referring to FIG. 2 and FIG. 3 in view of FIG. 5 and FIG. 6, the interception mechanism for conveyor belt production line abnormality further comprises a delivery device 60 and a topple sensing device 40. The delivery device 60 comprises a delivering belt 61 having an adjustable width. The delivery device 60 is perpendicularly disposed on one side of the conveyor belt device 10 for receiving the bottles 50. The topple sensing device 40 is disposed on one side of the conveyor belt device 10, and comprises at least a second sensing unit 41, an expandable tube 42, and a seat body 43. The second sensing unit 41 is electrically connected to the delivery device 60. The second sensing unit 41 is used to detect if any of the bottles 50 topple. When any one of the bottles 50 topples and is detected by the corresponding second sensing unit 41, the delivery device 60 stops operating. The expandable tube 42 is movably disposed on the seat body 43 and is able to expand and retract to change its length. Therefore, the expandable tube 42 is allowed to rotate or have its length adjusted to accommodate the size of the bottles 50 and adjust the detection position as needed.

Figure 4:
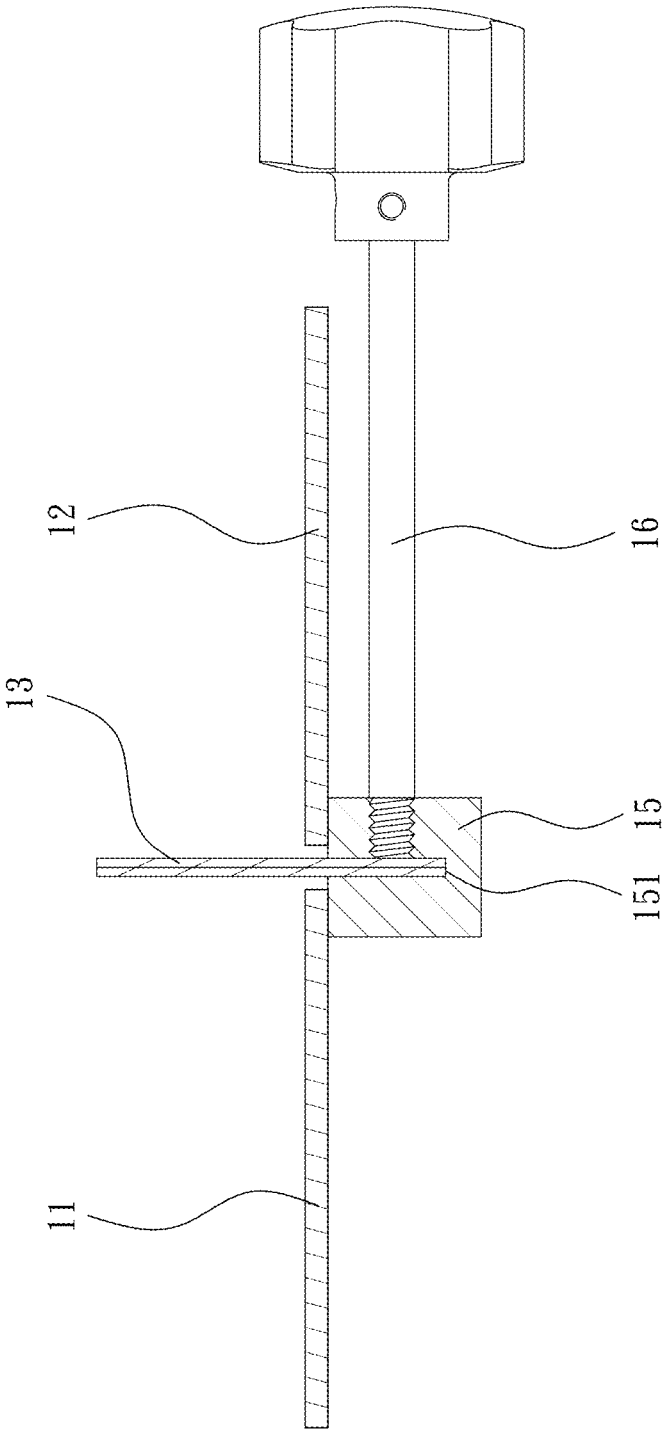
FIG. 4 is a structural schematic view illustrating the position limiting member pressing the movable fence on the track seat.

Referring to FIG. 4, the conveyor belt device 10 further comprises a track seat 15 and a plurality of position limiting members 16. The track seat 15 is disposed between a first conveyor belt 11 and a second conveyor belt 12. The track seat 15 comprises a slide groove 151 for a movable fence 13 to be slidably disposed therein. The position limiting members 16 rotatably pass through the track seat 15, respectively, and optionally abut against the corresponding movable fences 13.

Further referring to FIG. 5 and FIG. 6, the fullness sensing device 30 comprises a light 32 electrically connected with the corresponding first sensing unit 31; in other words, the light 32 is electrically connected with the first sensing unit 31 of the same fullness sensing device 30. When the first sensing unit 31 senses any of the bottles 50, the light 32 lights up, indicating that the system has sensed the presence of the bottles 50. Specifically, when the bottle 50 enters the sensing range of the first sensing unit 31, the first sensing unit 31 sends an electrical signal to the light 32, causing the light 32 to light up, according to which the user directly observes the position and status of the bottle 50, thereby effectively monitoring and managing the transportation process of the bottles 50.

Referring to FIG. 5 and FIG. 6, the fullness sensing device 30 comprises an intensity adjustment knob 33. The intensity adjustment knob 33 is used to control the sensing intensity of the first sensing unit 31. By rotating the intensity adjustment knob 33, the amplitude or sensitivity settings of the electrical signal is changed, thereby adjusting the sensing intensity of the first sensing unit 31. Specifically, by rotating the intensity adjustment knob 33, the parameters of the internal circuit, such as voltage or current, is adjusted, so as to affect the signal intensity received by the first sensing unit 31. For example, increasing the setting of the intensity adjustment knob 33 enhances the sensitivity of the first sensing unit 31, so as to enable it to detect smaller changes; in contrast, decreasing the setting of the intensity adjustment knob 33 reduces the sensitivity of the first sensing unit 31, making it suitable for detecting larger changes. Such adjustment method allows the system to flexibly modify the sensing intensity according to actual needs, thereby achieving an optimal monitoring results.

Further referring to FIG. 5 and FIG. 6, the conveyor belt device 10 comprises the first conveyor belt 11 and the second conveyor belt 12 disposed in a parallel arrangement, a plurality of the movable fences 13, and an allocation unit 14. The movable fences 13 are orderly disposed along a direction between the first conveyor belt 11 and the second conveyor belt 12, with a channel 131 formed between each two of the movable fences 13. The plurality of fullness sensing devices 30 is disposed on one side of the first conveyor belt 11 away from the second conveyor belt 12. The interception cylinder 20 is disposed on one side of the second conveyor belt 12 away from the first conveyor belt 11. The first conveyor belt 11 and the second conveyor belt 12 are used to transport the plurality of bottles 50, and the second conveyor belt 12 guides the plurality of nearby bottles 50 to pass the channel 131 to the first conveyor belt 11 through the allocation unit 14.

Figure 7:
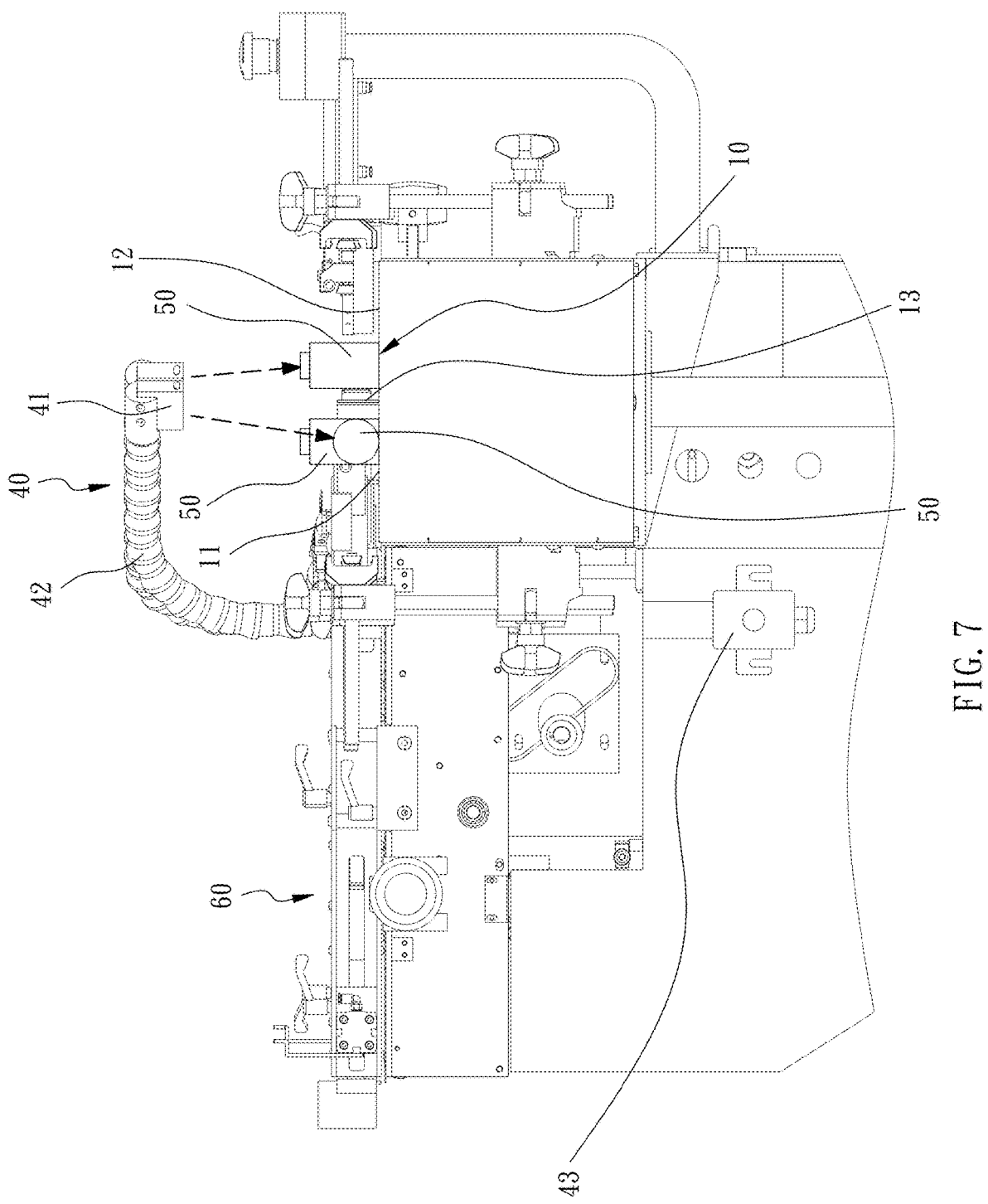
FIG. 7 is a schematic view illustrating the topple sensing device detecting a toppling bottle.

Further referring to FIG. 7, the second sensing unit 41 uses infrared light beam to detect the distance of the bottles 50. When the second sensing unit 41 detects a peripheral wall of a mouth of any of the bottles 50, the bottles 50 are deemed to be in a normal position. If the second sensing unit 41 detects the body of any of the bottles 50, the bottle 50 is deemed to be toppling. When a bottle 50 is deemed to be toppling, the delivery device 60 completely stops. When the user uprights the toppling bottle 50, the delivery device 60 continues to operate.

With the aforementioned configuration, the present invention achieves following advantages.

The transport frequency of the bottles 50 is under control. The plurality of fullness sensing devices 30 disposed on one side of the conveyor belt device 10 are electrically connected with the interception cylinder 20. When at least two of the first sensing units 31 simultaneously sense a bottle 50, the interception unit 21 extends and stops the bottle 50 from moving forward. When only one first sensing unit 31 senses a bottle 50 at one time, the interception unit 21 returns to its original position, allowing the bottles 50 to continue to be transported. Therefore, the transport frequency of bottles 50 is effectively controlled, so as to maintain smoothness of the transportation process.

Toppling bottles 50 are monitored. The topple sensing device 40 disposed on one side of the conveyor belt device 10 comprises the second sensing unit 41, and is able to send a signal to the delivery device 60. When any bottle 50 is detected as toppling, the delivery device 60 stops operating, allowing the user to immediately remove or upright the toppling bottle 50, thereby preventing damage and ensuring a smooth operation of the production line.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A interception mechanism for conveyor belt production line abnormality, comprising:

a conveyor belt device for transporting a plurality of bottles;

at least an interception cylinder movably disposed on one side of the conveyor belt device, the interception cylinder having an interception unit capable of moving across a top face of the conveyor belt device; and a plurality of fullness sensing devices disposed on one side of the conveyor belt device at intervals, the fullness sensing devices signally connected with the interception cylinder, each of the fullness sensing devices having a first sensing unit; when at least two of the first sensing units simultaneously sense any one of the bottles, the interception unit extends to stop the bottles from continuing to move forward; when only one of the first sensing units senses any one of the bottles at one time, the interception unit returns to its original position, allowing the bottles to continue to move.

2. The interception mechanism for conveyor belt production line abnormality of claim 1, wherein each of the fullness sensing devices comprises a light electrically connected with the corresponding first sensing unit; when each of the first sensing units senses one of the bottles, the light lights up.

3. The interception mechanism for conveyor belt production line abnormality of claim 2, wherein each of the fullness sensing devices has an intensity adjustment knob electrically connected with the first sensing unit; the intensity adjustment knob is used to control a sensing intensity of the first sensing unit.

4. The interception mechanism for conveyor belt production line abnormality of claim 3, further comprising a delivery device and a topple sensing device, wherein the delivery device comprises a delivering belt having an adjustable width; the delivery device is perpendicularly disposed on one side of the conveyor belt device; the delivering belt is used to receive the plurality of bottles; the topple sensing device is disposed on one side of the conveyor belt device; the topple sensing device has at least a second sensing unit electrically connected with the delivery device; the second sensing unit is used to sense if each of the bottles topples; when the second sensing unit senses any of the bottles toppling, the delivery device stops operating.

5. The interception mechanism for conveyor belt production line abnormality of claim 4, wherein each of the topple sensing devices comprises an expandable tube and a seat body; the expandable tube is movably disposed on the seat body; the expandable tube is able to expand and retract to change its length.

6. The interception mechanism for conveyor belt production line abnormality of claim 5, wherein each of the second sensing units uses infrared light beam to detect a distance between the plurality of bottles; when each of the second sensing units detects a peripheral wall of a mouth of any of the bottles, the bottle is deemed to be in a normal position; if each of the second sensing units detects a body of any of the bottles, the bottle is deemed to be toppling.

7. The interception mechanism for conveyor belt production line abnormality of claim 6, wherein the conveyor belt device comprises a first conveyor belt and a second conveyor belt disposed in a parallel arrangement, a plurality of movable fences, and an allocation unit; the movable fences are orderly disposed along a direction between the first conveyor belt and the second conveyor belt, with a channel formed between each two of the movable fences; the first conveyor belt and the second conveyor belt are used to transport the plurality of bottles, and the second conveyor belt guides the plurality of nearby bottles to pass the channel to the first conveyor belt through the allocation unit.

8. The interception mechanism for conveyor belt production line abnormality of claim 7, wherein the plurality of fullness sensing devices is disposed on one side of the first conveyor belt away from the second conveyor belt; the interception cylinder is disposed on one side of the second conveyor belt away from the first conveyor belt.

9. The interception mechanism for conveyor belt production line abnormality of claim 8, wherein the conveyor belt device further comprises a track seat and a plurality of position limiting members; the track seat is disposed between the first conveyor belt and the second conveyor belt; the track seat comprises a slide groove for the movable fences to be slidably disposed therein; the plurality of position limiting members rotatably passes through the track seat, respectively, and optionally abuts against the corresponding movable fences.

10. The interception mechanism for conveyor belt production line abnormality of claim 9, wherein a protection fence is disposed on two sides of the conveyor belt device, respectively.

* * * * *